(12) United States Patent
Xu (10) Patent No.: US 8,699,218 B2
(45) Date of Patent: Apr. 15, 2014

(54) PORTABLE COMPUTER SYSTEM

(75) Inventor: Shuang Xu, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 272 days.

(21) Appl. No.: 13/083,469

(22) Filed: Apr. 8, 2011

(65) Prior Publication Data

US 2011/0249391 A1  Oct. 13, 2011

(30) Foreign Application Priority Data

Apr. 8, 2010  (CN) .......................... 2010 1 0141965

(51) Int. Cl.
*H05K 7/00* (2006.01)

(52) U.S. Cl.
USPC ............ 361/679.33; 361/679.46; 361/679.31; 361/695; 361/688

(58) Field of Classification Search
USPC ........... 361/679.33, 679.46, 679.31, 695, 688
See application file for complete search history.

(56) References Cited

U.S. PATENT DOCUMENTS

| | | | |
|---|---|---|---|
| 5,579,489 A | 11/1996 | Dornier et al. | |
| 5,689,654 A | 11/1997 | Kikinis et al. | |
| 6,085,330 A | 7/2000 | Hewitt et al. | |
| 6,246,211 B1 | 6/2001 | Dalton et al. | |
| 6,769,036 B1 | 7/2004 | Cortopassi et al. | |
| 6,779,066 B2 | 8/2004 | Sakamoto | |
| 8,131,904 B2 | 3/2012 | Utz et al. | |
| 8,238,972 B2 * | 8/2012 | Wang et al. ................... | 455/558 |
| 2003/0172217 A1 | 9/2003 | Scott et al. | |
| 2007/0006290 A1 | 1/2007 | Li | |
| 2007/0294457 A1 | 12/2007 | Gantman et al. | |
| 2008/0250179 A1 | 10/2008 | Moon | |
| 2009/0193243 A1 | 7/2009 | Ely | |
| 2010/0325460 A1 | 12/2010 | Chen et al. | |
| 2013/0163195 A1 | 6/2013 | Pelletier | |
| 2013/0212402 A1 | 8/2013 | Seevers et al. | |

OTHER PUBLICATIONS

Office Action from Chinese Patent Application No. 201010141965.4, dated Aug. 21, 2012.
Office Action from Chinese Patent Application No. 201010141965.4, dated Mar. 28, 2013.
Non-Final Office Action from U.S. Appl. No. 13/335,850, dated Sep. 13, 2013.
Office Action from Chinese Patent Application No. 201010141965.4, dated Jun. 27, 2013.

* cited by examiner

*Primary Examiner* — Robert J Hoffberg
*Assistant Examiner* — Hung Dang
(74) *Attorney, Agent, or Firm* — Zilka-Kotab, PC (57) ABSTRACT

A portable computer system is disclosed according to the invention. The portable computer system comprises: a multi-functional processing unit with power consumption of no more than approximately 10 watts consisting of a single chip having a plurality of processors thereon, wherein each processor is operable for at least one task selected from a group consisting of computing, graphic processing and audio processing; a mother board to which the multi-functional processing unit is connected; a memory unit connected to the motherboard and in communication with the multi-functional processing unit; and an I/O interface connected to the motherboard and in communication with the multi-functional processing unit, the portable computer system is configured to insert into a interface of a peripheral device to communicate between the portable computer system and the peripheral device.

21 Claims, 5 Drawing Sheets

Figure 5C

PORTABLE COMPUTER SYSTEM

CLAIM OF PRIORITY

The present application claims the priority of Chinese Patent Application No. 20100141965.4, filed Apr. 8, 2010, which is incorporated herein by reference.

FIELD OF THE INVENTION

The present invention relates to a computer system, and more particularly to a portable computer system.

BACKGROUND

With the increasing integration degree of integrated circuits (ICs), more and more functions can be combined on a single chip. Currently, there is a chip available referred to as a "Computer-On-a-Chip" ("CoC") or "System-On-a-Chip" ("SoC"), such as the Tegra™ processor from NVIDIA Corporation. The CoC or SoC is a heterogeneous processor architecture with multiple processors, each designed for a specific class of tasks including, but not limited to, a central processing unit (CPU), a video processor, an image processor, an audio processor and a memory. These processors are used together or independently to perform what can be implemented in a traditional PC, but integrated onto a single chip. Besides the variety of functions, this CoC or SoC has another advantage in that it usually has ultra-low power consumption of several watts, for example, when working on a full load.

Due to these advantages of the CoC/SoC, more and more electrical devices start to use these chips, for example, in mobile phones, PCs or even cars. These chips can be used separately in the electrical devices, or used in parallel with traditional CPU chips to use different functions of different chips. However, in the traditional application, CoC/SoC is disposed with the electrical device. For example, CoC/SoC is mounted on the motherboard of the electrical device. It is very hard to detach CoC/SoC from the electrical device. That is to say, every electrical device must be provided with CoC/SoC if it intends to adopt CoC/SoC However, this will increase the cost of an electrical device. One the other hand, in order to meet different needs of different people, it is not necessary to provide the CoC/SoC to some electrical devices. Thus, after a user bought an electrical device without CoC/SoC, it is hard to provide such device with CoC/SoC.

Therefore, a computer system is needed to solve the above problems.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified need a portable computer system is provided. The portable computer system comprises: a multi-functional processing unit with power consumption of no more than approximately 10 watts consisting of a single chip having a plurality of processors thereon, wherein each processor is operable for at least one task selected from a group consisting of computing, graphic processing and audio processing; a mother board to which the multi-functional processing unit is connected; a memory unit connected to the motherboard and in communication with the multi-functional processing unit; and an I/O interface connected to the motherboard and in communication with the multi-functional processing unit, the portable computer system is configured to insert into a interface of a peripheral device to communicate between the portable computer system and the peripheral device.

The portable computer system may be connected to other systems via its I/O interface to expand the function of other systems, and it can be removed from such other systems when needed. The portable computer system is easy to take and to detach, and has small size.

Other features and embodiments are described below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Certain specific details are set forth in the following description to provide a thorough understanding of the present invention. However, those of ordinary skill in the relevant art will understand that they can practice the present invention without one or more of the details described below. Certain well-known details that are common use in the on are not set forth in the following disclosure to avoid unnecessarily obscuring the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

it should be borne in mind, however, that all of these and similar terms are associated with the appropriate physical quantities and are merely convenient labels applied to these quantities, Unless specifically stated otherwise as apparent from the following discussions, it is appreciated that throughout the present application, discussions utilizing terms such as "processing", "computing", "calculating", "determining", "displaying", "accessing", "writing", "including", "storing", "transmitting", "traversing", "associating", "identifying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

Described below is a portable computer system. Using the SoC/CoC chip as a CPU, the portable computer system is capable of connecting to other systems that do not provided with the SoC/CoC chip or that need the functions provided by the SoC/CoC chip through its interface to expand the functions of these systems. These functions may include, but are not limited to, computing, displaying images, playing videos and running a variety of applications. And the portable computer system may be removed easily from these other systems when the portable computer system is not needed anymore. After removal, the portable computer system may be easily attached to these systems again. Therefore, only one such portable computer system is needed to turn other systems to be systems comprising SoC/CoC chip.

Figure 1:
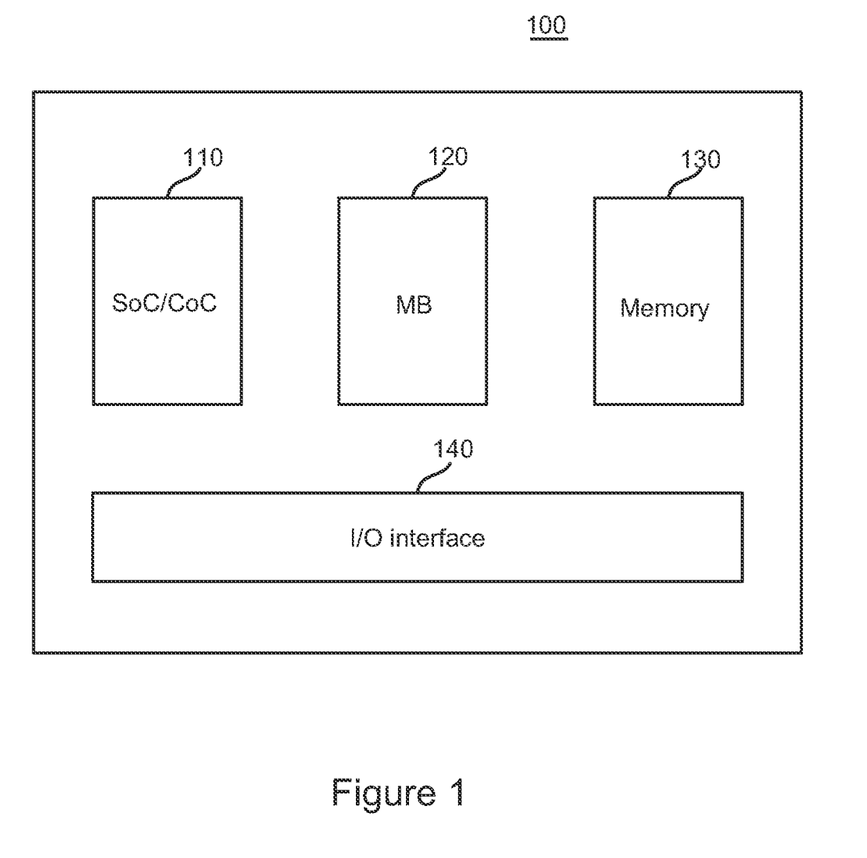
FIG. 1 shows the architecture of an exemplary portable computer system according to the present invention.

Referring to FIG. 1, shown an exemplary architecture of a portable computer system 100 according to the present invention. The portable computer system 100, for example, may comprise a SoC/CoC 110, a mother board (MB) 120, a memory 130 and an I/O interface 140. The SoC/CoC 110 is a kind of multi-functional processing unit having multiple processors on a single chip, each processor designed for a specific class of tasks. The SoC/CoC 110 may comprise, but is not limited to, a CPU, a video processor, an image processor, and an audio processor. An example of such a commercially available SoC/CoC 110 is the Tegra™ processor from NVIDIA Corporation. The SoC/CoC 110 has a high degree of integration and thus a small size. It also usually has an ultra-low power consumption of less than 10 watts, for example, even when working on a full load. The mother board (MB) 120 may adopt forms and architectures commonly known and used in the art. Preferably, the MB 120 may also have a high degree of integration and a small size such that when the SoC/CoC 110 is affixed to the MB 120, it constitutes a small scale portable computer system. The memory 130 may adopt forms and architectures commonly known and used in the art, such as random access memory (RAM), read only memory (ROM), hard disk drives, flash memory, and so on. However, in consideration of factors including stability of operation, high storage capacity, requirements for operating silently for long times and small size, flash memory is preferable for the memory 130. Also, the memory 130 may comprise a RAM and a flash memory so that the RAM may be used as an express memory and the flash memory may be used as a massive storage. Although a separate memory 130 is shown in FIG. 1, the memory 130 may alternatively be integrated with or embedded in the SoC/CoC 110.

As a system that may work together with other systems, the portable computer system 100 has an I/O interface 140 operable for accepting different types of peripheral devices. The I/O interface 140 may be configured to have a variety of interfaces commonly known and used in the art including, but not limited to, a data transfer port such as Universal Serial Bus (USB) port, a parallel port, a serial port, IEEE 1394 port, video and audio ports such as Video Graphics Array (VGA), High-Definition Multi media Interface (HDMI), Super Video (S-Video), audiovisual (AV) and Digital Visual Interface (DVI) ports, and cable and wireless communication ports such as local area network (LAN) and wireless fidelity (Wi-Fi) ports. Among the above interfaces, HDMI supports uncompressed high-definition digital video and multi-channel audio being transferred on a single cable, and supports various image formats of TV and computer, such as SDTV, HDTV, etc. Therefore the I/O interface 140 preferably uses the HDMI. Further, due to the small size of the HDMI, the portable computer system 100 can be very small. This HDMI may be a male one as well as a female one. Since most electrical devices are provided with female HDMI, the I/O interface 140 of the portable computer system 100 preferably uses male HDMI. Through the I/O interface 140, the portable computer system 100 may be inserted into other systems directly, for example into the female HDMI of a TV. Thus a HDMI cable is omitted and cost is saved. Thus, the portable computer system 100 will treat the connected systems as its peripheral device to expand the functions of such systems.

Figure 2:
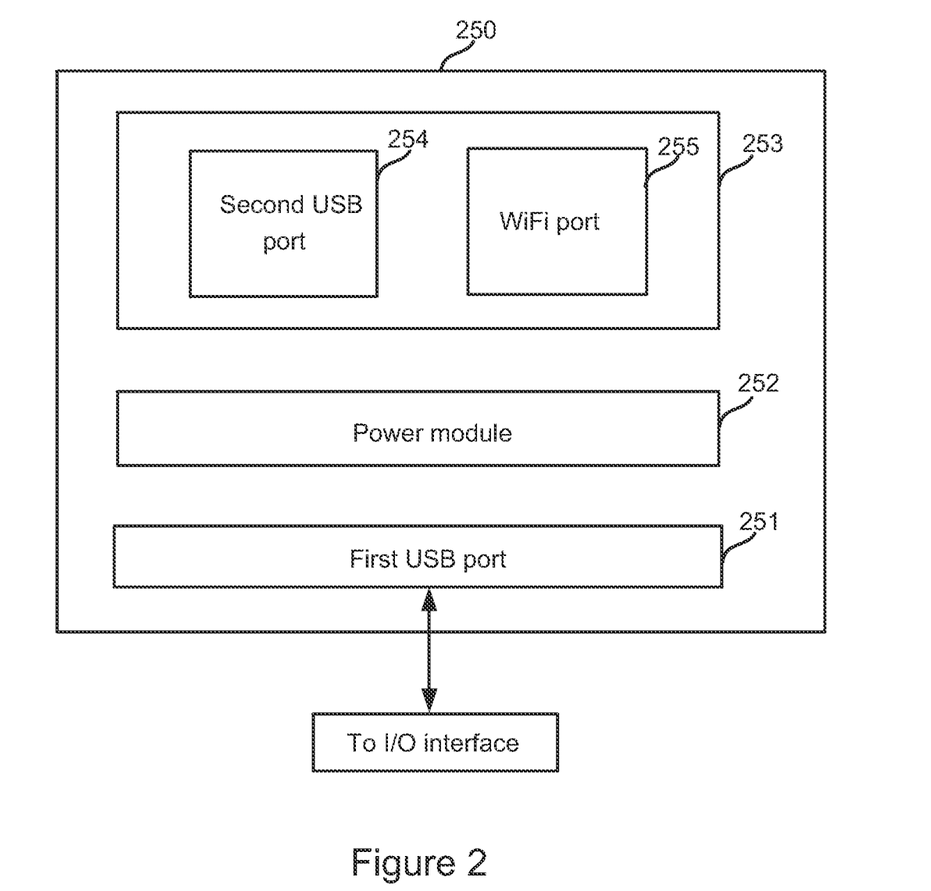
FIG. 2 shows the architecture of an exemplary power supply device for a portable computer system according to the present invention.

When the HDMI is adopted in the I/O interface 140, a power supply device is provided for supplying power to the portable computer system 100 since the HDMI cannot provide power as the USB does. Under this situation, the I/O interface 140 of the portable computer system 100 comprises a USB port through which the I/O interface 140 is connected to the power supply device. The portable computer system 100 and the power supply device may constitute a hybrid computer system. Referring to FIG. 2, showing the architecture of an exemplary power supply device 250 of the portable computer system 100 according to the present invention. The power supply device 250 comprises a first USB port 251 and a power module 252. The first USB port 251 is connected to the power module 252 and to the USB port of the I/O interface 140. The power supply 250 plugs into a power supply, wherein the power module 252 may exchange 20-230V AC to 5V DC which will be supplied to the portable computer system 100 through the first USB port 251. Further, the power supply device 250 may comprise a USB cable for connecting the power module 252 and the first USB port 252 to increase the reach of the power supply device 250. In order to further expand the functions of the portable computer system 100, the power supply device 250 may comprise an interface module 253 which can communicate with the portable computer system 100 through the first USB port 251. More peripheral devices may be connected to the portable computer system 100 through the interface module 253. Preferably, the interface module 253 comprises one or more second USB ports 254 and a WiFi port 255. The second USB ports 254 may be used to connect other peripheral devices, such as a mouse, a keyboard, etc. The WiFi port 255 enables the portable computer system 100 communicating wirelessly with other systems. Further, in the case that the I/O interface 140 of the portable computer system 100 comprises USB port to supply power, such USB port is configured to be a logical master USB port to provide control and receive power, and the first USB port 251 arranged on the power supply device 250 is configured to be a logical slave USB port to supply power to the portable computer system 100. The above mentioned USB ports may be substituted with mini-USB ports to decrease the size of the portable computer system. It can be understood that the interface module 253 may comprise any suitable interfaces, and not be limited to the second USB ports 254 and the WiFi port 255 mentioned above.

Figure 3:
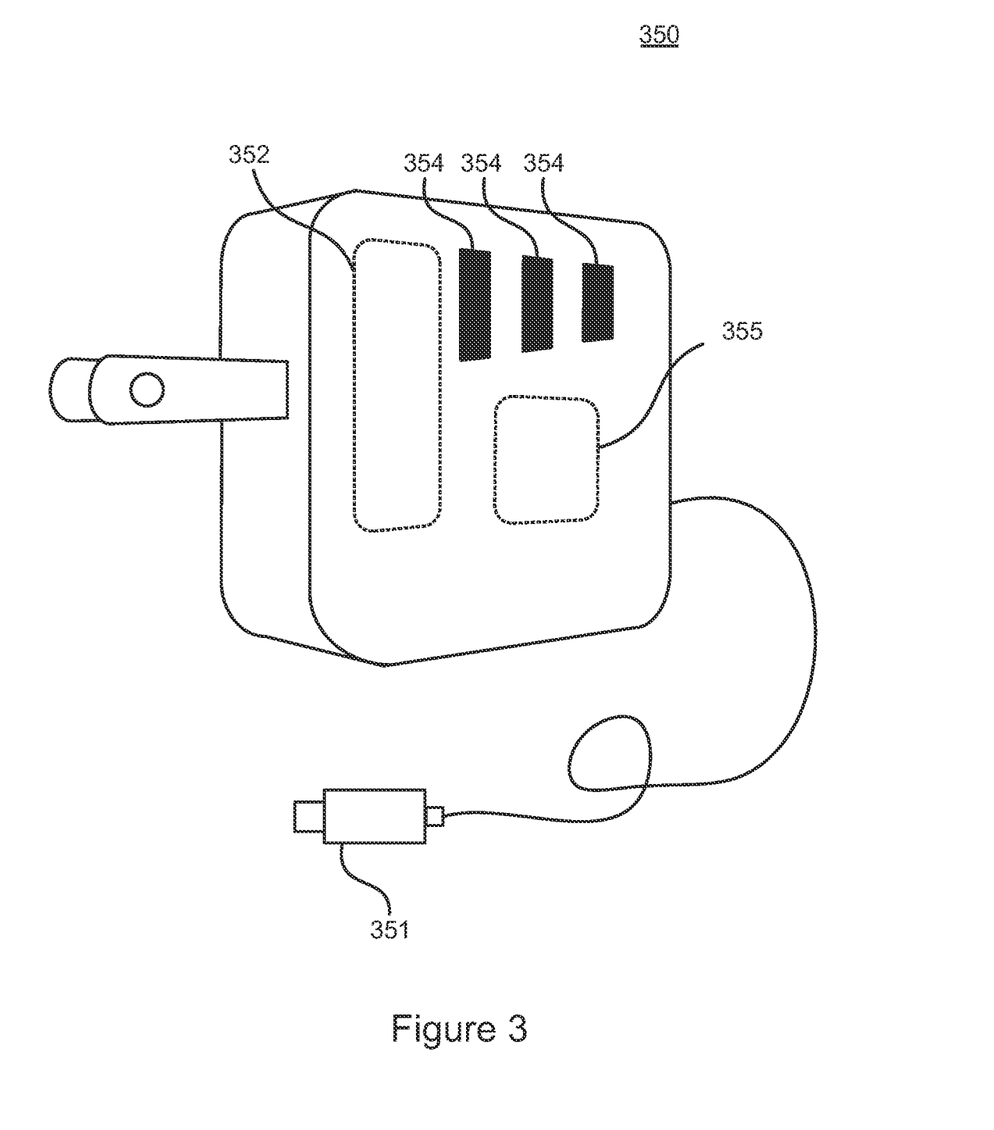
FIG. 3 is a schematic diagram of a power supply device for a portable computer system according to the present invention.

Referring to FIG. 3 more specifically. FIG. 3 is a schematic diagram of a power supply device 350 for the portable computer system 100 according to the present invention. The power supply device 350 is realized in the form similar as the traditional charger of a handheld phone. The power supply device 350 comprises a first USB port 351, a power module 352, multiple (three) second USB ports 354 and WiFi port 355. These ports and module have the same or similar meanings as those of the power supply device 250 described in conjunction with FIG. 2, and will not be described herein. It is obvious that the power supply device 350 may supply power to other electrical device, such as a MP3, a mobile phone, etc. Also it is understood that a traditional USB charger may substitute the power supply device 350 for the purpose of supplying power to the portable computer system 100.

Alternatively, the I/O interface 140 of the portable computer system 100 may adopt a USB port instead of the HDMI to connect to other systems. Therefore the portable computer system 100 can be supplied with power from the connected systems through such USB port. Under this situation, the portable computer system 100 does not need to be provided with a power supply device, which will further increase the portability of the portable computer system 100.

Using the I/O interface 104, the portable computer system 100 may be connected to various peripheral devices, such as display device, mouse, keyboard, printer, microphone, speaker, camera or router, etc. All the ports may be integrated into the motherboard 120. Therefore, the portable computer system 100 can be used as a micro-computer to execute the tasks that are used to execute on traditional PC. Preferably, the portable computer system 100 is connected to a display device, such as a TV, a monitor, a projector, etc., so that the powerful image processing ability of the SoC/CoC 110 of the portable computer system 100 may be used to playback high-definition video or images.

Figure 4:
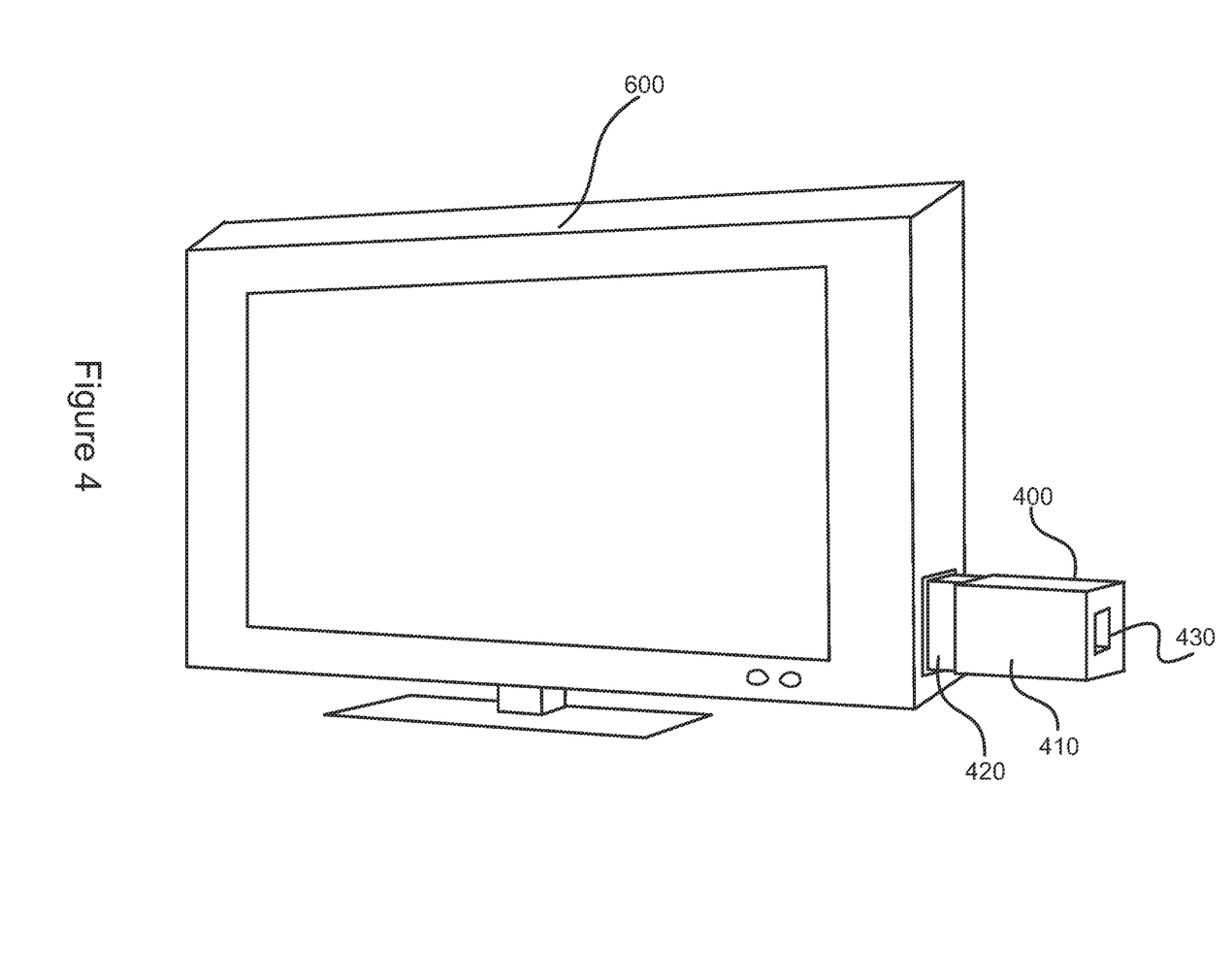
FIG. 4 shows the connection between a TV and an exemplary portable computer system according to the present invention.

Referring to FIG. 4 which shows the connection between a TV 600 and an exemplary portable computer system 400 according to the present invention. FIG. 4 is only for illustration purpose and it does not represent the real ratio relations between the components. The portable computer system 400 comprises a SoC/CoC, a motherboard (MB), a memory and an I/O interface which have the same or similar meanings as the SoC/CoC 110, the motherboard (MB) 120, the memory 130 and the I/O interface 140 of the portable computer 100. Thus the details of these components will not describe here. Further, the portable computer system 400 may be enclosed into a case 410) for containing and protecting the above components. The material of the case 410 may be acrylic or other materials, such as plastic or metal. In this embodiment, the I/O interface of the portable computer system 400 comprises a HDMI 420 and a USB port 430. The HDMI 420 may be inserted into the HDMI of the TV 600. Since the HDMI 420 is adopted in this embodiment, the portable computer system 400 further comprises the USB port 430 for supplying power. It is understood that the portable computer system 400 may adopt a USB port to connect to the TV 600. And no power supply device is needed under this situation.

Figure 5A:
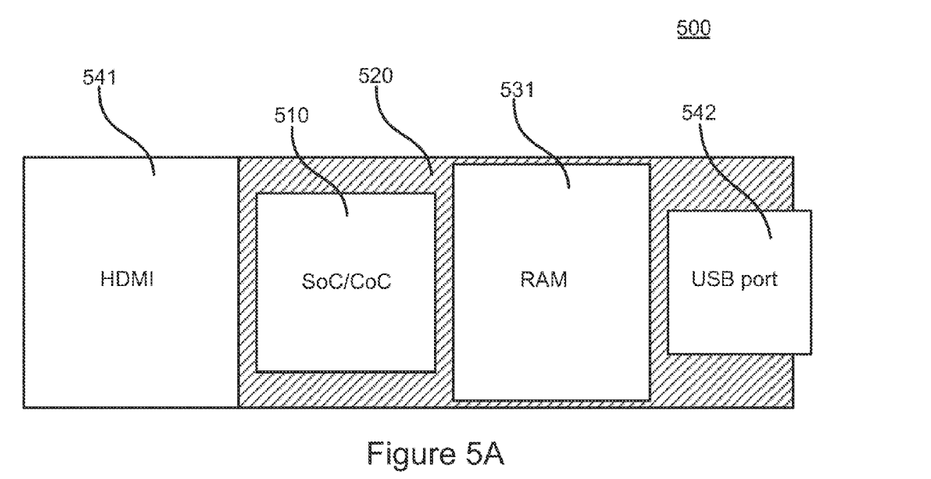
FIGS. 5A-5C show schematic diagrams of a portable computer system according to the present invention.
Figure 5B:
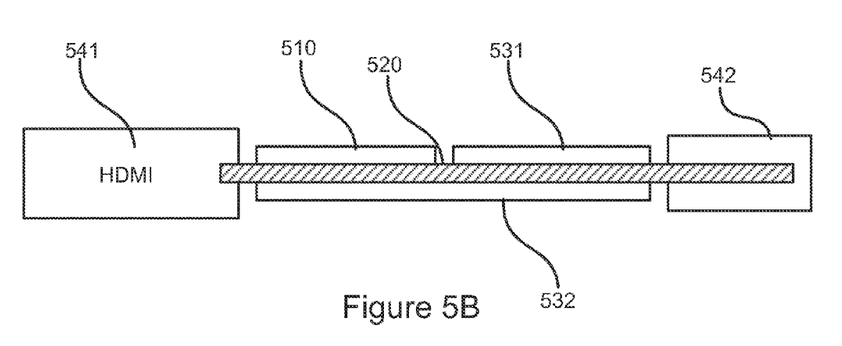
Figure 5C:
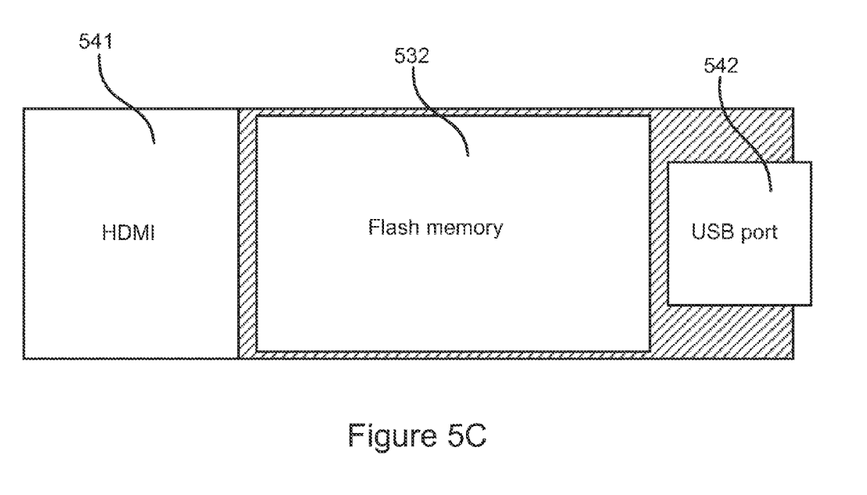

FIGS. 5A-5C show schematic diagrams of a portable computer system 500 according to the present invention, wherein FIG. 5A is a top view of the portable computer system 500, FIG. 5B is a front view of the portable computer system 500 and FIG. 5C is a bottom view of the portable computer system 500, FIGS. 5A-5C further show that the portable computer system 500 has very small size. The portable computer system 500 comprises a SoC/CoC 510, a motherboard (MB) 520, a RAM 531, a flash memory 532, a HDMI 541 and a USB port 542. The portable computer system 500 comprises two memory devices, wherein the RAM 531 is an express memory and flash memory is a massive memory. The portable computer system 500 adopts the 541 to interface with other systems and adopts the USB port 542 to supply power thereto. The USB port 542 for example may be connected to the above power supply device. The descriptions of the components of the portable computer system 500 are detailed above and will not be omitted for brevity. From the figures, it can be seen that the SoC/CoC 510, the RAM 531, the flash memory 532, the HDMI 541 and the USB port 542 are all connected to the motherboard (MB) 520. The HDMI 541 is connected to one end of the MB 520 and the USB port 542 is connected to the other end of the MB 520. The SoC/CoC 510, the RAM 531 and the flash memory 532 are arranged on the upper and the lower sides of the MB 520. The length, width and height of the portable computer system 500 are 44 mm, 14 mm and 5 mm, respectively.

Due to the technical solution disclosed herein, the portable computer system has very small size. For example, the length, width and height of the portable computer system 400 are respectively between 40-60 mm, 10-20 mm and 5-10 mm. The size of the portable computer system generally equals to that of a traditional U-disk. This portable computer system in the form of U-disk is easy to take and to be connected to other systems to expand the function of the other systems. Due to the small size, it will not be noticed when it is connected to other systems, for example a TV. And it will not make other systems expanding too much.

Some specific example applications for the portable computer according to the present invention are introduced below.

Exemplary Embodiment 1

Connecting to TV

Large-Screen TV has entered into almost every family and has more and more function. For example, a TV may be connected to a digital camera to watch pictures or videos, or to a DVD to watch high-definition videos. Also the TV may be connected to a traditional PC to function as a display device of the PC. However, it is not convenient to connect the TV to the PC due to the big size of the PC. And due to the great power consumption of the PC, the PC cannot be connected to the TV for a long time, such as 24 hours, 7 days-a-week. The portable computer system according to the present invention may be connected to a TV conveniently due to its small size, and for long time due to its low power consumption. Through the interface module of the power supply device of the portable computer system, peripheral devices such as mouse, keyboard, etc. may be connected to the portable computer system. Thus the large-screen TV may be used as the display device of the portable computer system to surf on the internet or run applications. If a user wants to watch TV, the portable computer system may be detached from the TV. Therefore, the function of the TV may be changed according to the user's need. Further, the massive storage of the portable computer system may be used to store data which may be displayed on the TV. Since the SoC/CoC chip in the portable computer system has powerful processing ability, the play effect is better than that only on the TV.

Exemplary Embodiment 2

Connecting to PC

As the bandwidth of the Internet increases, the ability to download high volumes of data over the Internet is becoming increasingly important in web-based applications. Users are increasingly downloading High Definition (HD) movies online, playing games online in real-time, backing up their local data to online servers, downloading a variety of large software applications and updates, and downloading and uploading music and video content directly to and from websites or via point to point (P2P) and file sharing tools such as Bit Torrent. All this online activity results in large masses of data needed to be downloaded from and uploaded to the Internet on a daily basis.

A traditional PC usually has a power consumption of about 100 watts when running applications and programs that frequently download and upload data from and to the Internet. This is unacceptably high power consumption if such programs are running for 24 hours, 7 days-a-week. If a user wants to download and upload data, he may connect the portable computer system according to an embodiment of the present invention to a traditional PC to download and upload data using the portable computer system with low power consumption. And the PC maintains itself in a state of hibernation. In this way, the power consumption is only a few Watts, which is no more than 10% of the traditional PC power consumption running such applications.

The portable computer system according to the present invention may be connected to various systems to expand the function of the systems, and it may be removed from the systems conveniently.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application to thereby enable others skilled in the art to best utilize the invention and various embodiments with various modifications as are suited to the particular use are contemplated. The scope of the invention is to be defined by the claims appended hereto and their equivalents.

What is claimed is:

1. A portable computer system, comprising:
a multi-functional processing unit with power consumption of no more than approximately 10 watts consisting of a single chip having a plurality of processors thereon, wherein each processor is operable for at least one task selected from a group consisting of computing, graphic processing, and audio processing;
a mother board to which the multi-functional processing unit is connected;
a memory unit connected to the motherboard and in communication with the multi-functional processing unit; and
an I/O interface connected to the motherboard and in communication with the multi-functional processing unit, wherein the I/O interface comprises a male HDMI and a USB port;
wherein the portable computer system is configured to insert into an interface of a peripheral device to communicate between the portable computer system and the peripheral device.

2. The portable computer system of claim 1, wherein the memory unit is selected from the group consisting of RAM, ROM, hard disk drive, and flash memory.

3. The portable computer system of claim 1, wherein the I/O interface further comprises at least one of a parallel port, serial port, IEEE 1394, VGA, S-Video, AV, DVI, LAN and WiFi.

4. The portable computer system of claim 1, wherein the portable computer system is provided with a power supply device and the power supply device is connected to the I/O interface for communicating and power supplying.

5. The portable computer system of claim 4, wherein the power supply device comprises a power module.

6. The portable computer system of claim 4, wherein the power supply device comprises a first USB port, one or more second USB port, and a WiFi port.

7. The portable computer system of claim 6, wherein the one or more second USB port and the WiFi port communicate with the first USB port which is connected to the USB port of the I/O interface.

8. The portable computer system of claim 6, wherein the power supply device further comprises a USB cable for connecting the first USB port.

9. The portable computer system of claim 6, wherein the portable computer system receives communication from the power supply device through the first USB port of the power supply device.

10. The portable computer system of claim 9, wherein at least one second peripheral device is connected to the power supply device using the one or more second USB port of the power supply device, and wherein the portable computer system receives communication from the at least one second peripheral device through the first USB port of the power supply device.

11. The portable computer system of claim 9, wherein at least one system communicates wirelessly with the portable computer system using the power supply device and the WiFi port of the power supply device.

12. The portable computer system of claim 1, wherein the portable computer system is enclosed into a case.

13. The portable computer system of claim 12, wherein the case comprises an acrylic material.

14. The portable computer system of claim 12, wherein a length, a width, and a height are between 40-60 mm, 10-20 mm, and 5-10 mm respectively.

15. The portable computer system of claim 1, wherein the peripheral device is selected from a group consisting of a TV, a computer, a display device, and a projector.

16. The portable computer system of claim 1, wherein the male HDMI of the portable computing system is inserted into an HDMI port of a display device, and the portable computing system receives power from a USB port of the display device.

17. A hybrid portable computer system, comprising:
a portable computer system, comprising:

a multi-functional processing unit with power consumption of no more than approximately 10 watts consisting of a single chip having a plurality of processors thereon, wherein each processor is operable for at least one task selected from a group consisting of computing, graphic processing, and audio processing, a mother board to which the multi-functional processing unit is connected, a memory unit connected to the motherboard and in communication with the multi-functional processing unit, and an I/O interface connected to the motherboard and in communication with the multi-functional processing unit, wherein the I/O interface comprises a male HDMI and a USB port; and a power supply device for supplying power to the portable computer system;

wherein the portable computer system is configured to insert into a interface of a peripheral device to communicate between the portable computer system and the peripheral device.

18. The hybrid portable computer system according to claim 17, wherein the power supply device comprises a power module.

19. The hybrid portable computer system according to claim 17, wherein the power supply device comprises a first USB port, one or more second USB port, and a WiFi port.

20. The hybrid portable computer system according to claim 19, wherein the one or more second USB port and the WiFi port communicate with the first USB port which is connected to the USB port of the I/O interface.

21. The hybrid portable computer system according to claim 19, wherein the power supply device further comprises a USB cable for connecting the first USB port.

* * * * *